US005500269A

United States Patent [19]

Terry

[11] Patent Number: 5,500,269

[45] Date of Patent: * Mar. 19, 1996

[54] HONEYCOMB TABLE MANUFACTURE AND CLEAN-ROOM COMPATIBLE HONEYCOMB TABLES

[75] Inventor: Dennis C. Terry, Costa Mesa, Calif.

[73] Assignee: Newport Corporation, Irvine, Calif.

[ * ] Notice: The portion of the term of this patent subsequent to Nov. 4, 2013, has been disclaimed.

[21] Appl. No.: 920,132

[22] Filed: Jul. 24, 1992

Related U.S. Application Data

[63] Continuation-in-part of Ser. No. 591,932, Oct. 2, 1990, Pat. No. 5,154,963, which is a continuation-in-part of Ser. No. 336,893, Apr. 12, 1989, Pat. No. 5,021,282, which is a division of Ser. No. 148,592, Jan. 26, 1988, Pat. No. 4,853,065, which is a continuation-in-part of Ser. No. 890,632, Jul. 30, 1986, abandoned, which is a continuation-in-part of Ser. No. 663,343, Oct. 22, 1984, Pat. No. 4,621,006.

[51] Int. Cl.$^6$ ..................................................... B32B 3/12
[52] U.S. Cl. .......................... 428/116; 428/117; 428/118; 428/131; 428/138
[58] Field of Search ..................................... 156/197, 292; 428/116, 117, 118, 131, 138; 298/637

[56] References Cited

U.S. PATENT DOCUMENTS

| | | | |
|---|---|---|---|
| 2,870,857 | 1/1959 | Golsstein | 428/116 |
| 3,070,480 | 12/1962 | Breiner | 428/116 |
| 3,087,565 | 4/1963 | Kerwin, Jr. | 181/208 |
| 3,087,571 | 4/1963 | Kerwin, Jr. | 181/208 |
| 3,104,194 | 9/1963 | Zahorski | 428/116 |
| 3,137,604 | 6/1964 | Bosch | 156/207 |
| 3,176,662 | 4/1965 | Williams | 211/69.5 |
| 3,249,659 | 5/1966 | Voelker | 428/116 |
| 3,456,806 | 7/1969 | Borston | 211/60.1 |
| 3,601,343 | 8/1971 | Sivaslian | 248/637 |
| 3,606,460 | 9/1971 | Shannon | 297/445 |
| 3,627,246 | 12/1971 | Widding et al. | 248/188.8 |

(List continued on next page.)

FOREIGN PATENT DOCUMENTS 836401 4/1952 Germany.

OTHER PUBLICATIONS

Mechanical Properties of Hexcel Honeycomb Materials, TSB 120, by Hexcel Corporation (1982 Revision).
*The Basics on Bonded Sandwich Construction*, TSB 124, by Hexcel Corporation (1982 Revision); Newport Corporation 1983–84 Catalog, pp. 3 et seq., 2nd Edition.
*Optical Hardware*, by Melles Griot (1983), pp. 2 to 6; *Photonics*, by Technical Manufacturing Corp., of Peabody, MA 0196 Oct. 1985 and Jan. 1986
*Lasers & Applications*, by Technical Manufacturing Corp., of Peabody MA 01960, Sep. 1985.
The Newport Catalog, No. 100, 1987.
1977–78 Catalog, Newport Research Corporation.

Primary Examiner—Alexander S. Thomas
Assistant Examiner—Timothy M. Speer
Attorney, Agent, or Firm—Benoit Law Corporation

[57] ABSTRACT

A method of manufacturing a honeycomb table having a table leaf with apertures suitable for mounting components in sensitive applications, attaches a supporting section to that table leaf, attaches a sealing sheet to that supporting section, attaches a section of honeycomb core to that sealing sheet, and attaches a facing sheet at a position on the table such that the section of honeycomb core is positioned between the table leaf and that facing sheet. Apertures are drilled and tapped in the table leaf. A honeycomb table having at least a width dimension comprises a top facing sheet perforated with openings having a top surface for supporting components and a bottom surface, a bottom facing sheet parallel to the top facing sheet, a section of corrugated sheet material extending for at least a distance corresponding substantially to the width of the table beneath the top facing sheet, and a honeycomb core having cells of equal length extending between continuous flat top and bottom surfaces and between the section of corrugated sheet material and the bottom facing sheet. The section of corrugated sheet material is secured to the bottom surface and between the top facing sheet and the honeycomb core.

10 Claims, 3 Drawing Sheets

U.S. PATENT DOCUMENTS

| | | | |
|---|---|---|---|
| 3,754,812 | 8/1973 | Mohn | 428/116 |
| 3,765,993 | 10/1973 | Raffensparger et al. | 156/563 |
| 3,784,146 | 1/1974 | Matthews | 248/562 |
| 3,836,416 | 9/1974 | Ropiequet | 428/294 |
| 4,035,061 | 7/1977 | Sheridon | 156/581 |
| 4,066,249 | 1/1978 | Huber et al. | 269/21 |
| 4,182,553 | 1/1980 | Sheridon | 359/43 |
| 4,221,014 | 9/1980 | Davidson | 114/343 |
| 4,241,892 | 12/1980 | Morris | 248/346 |
| 4,294,329 | 10/1981 | Rose et al. | 250/491.1 |
| 4,300,978 | 11/1981 | Whitemore et al. | 156/581 |
| 4,360,184 | 11/1982 | Reid III | 298/573 |
| 4,370,372 | 1/1983 | Higgins et al. | 428/116 |
| 4,465,725 | 8/1984 | Riel | 428/116 |
| 4,621,006 | 11/1986 | Terry et al. | 428/116 |
| 4,645,171 | 2/1987 | Heide | 248/637 |
| 4,666,748 | 5/1987 | Rinkewich | 428/12 |
| 4,853,065 | 8/1989 | Terry et al. | 156/292 |
| 4,913,953 | 4/1990 | Prewo et al. | 428/131 |
| 5,021,282 | 6/1991 | Terry et al. | 428/116 |
| 5,061,541 | 10/1991 | Gertel | 428/116 |

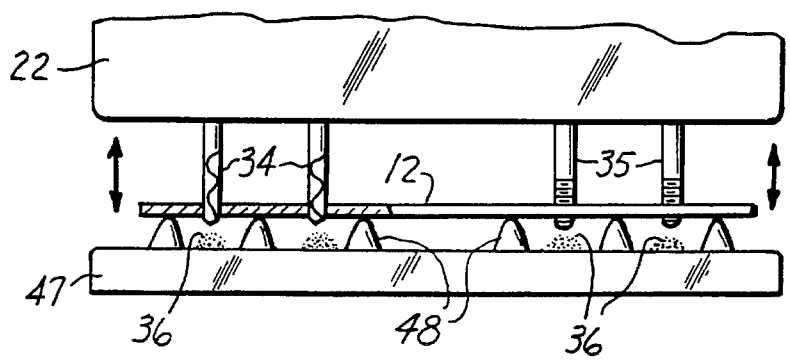
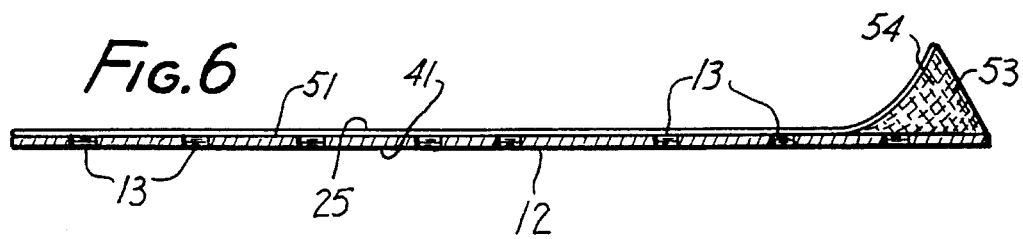
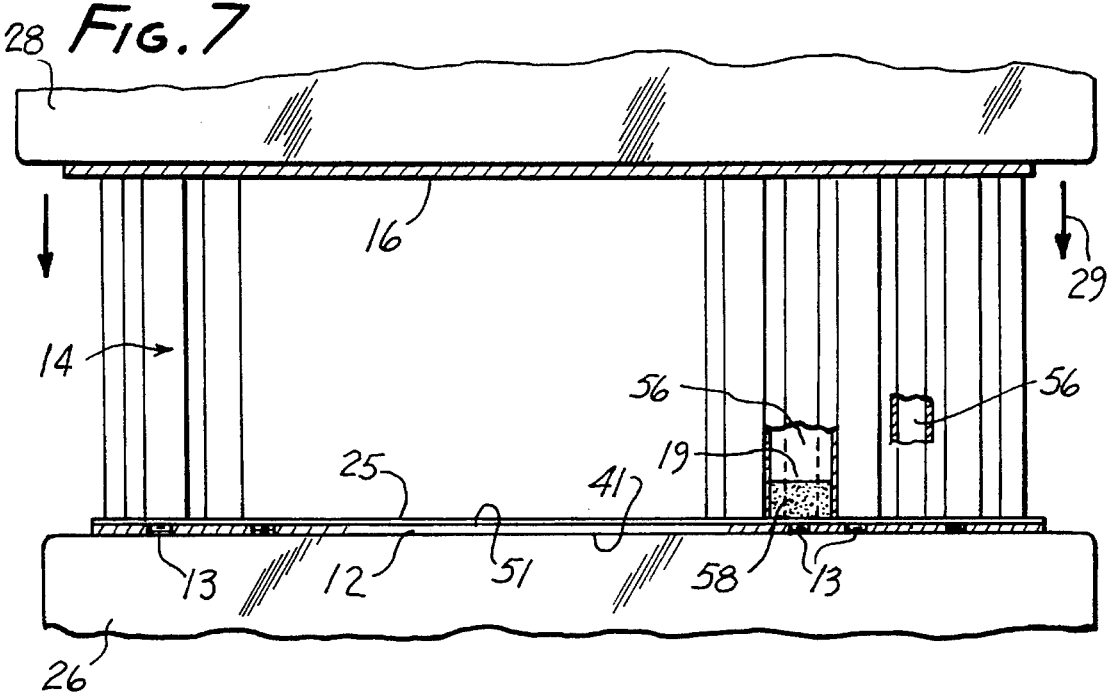

HONEYCOMB TABLE MANUFACTURE AND CLEAN-ROOM COMPATIBLE HONEYCOMB TABLES

CROSS-REFERENCE TO RELATED APPLICATION

This is a continuation-in-part of patent application Ser. No. 07/591,932, filed Oct. 2, 1990 by Dennis C. Terry (now U.S. Pat. No. 5,154,963, issued Oct. 13, 1992) as a continuation-in-part of patent application Ser. No. 07/336,893, filed Apr. 12, 1989 by Dennis C. Terry et al (now U.S. Pat. No. 5,021,282, issued Jun. 4, 1991) as a division of patent application Ser. No. 07/148,592, filed Jan. 26, 1988 by Dennis C. Terry et al (now U.S. Pat. No. 4,853,065, issued Aug. 1, 1989) as a continuation-in-part of patent application Ser. No. 06/890,632, filed Jul. 30, 1986 by Dennis C. Terry et al, now abandoned, as a continuation-in-part of patent application Ser. No. 06/663,343, filed Oct. 22, 1984 by Dennis C. Terry et al, issued as U.S. Pat. No. 4,621,006, on Nov. 4, 1986 to the common assignee, and herewith incorporated by reference herein.

BACKGROUND OF THE INVENTION

1. Field of the Invention

The subject invention relates to honeycomb panels and tables, honeycomb panel and table manufacture, and optical tables including honeycomb and similar structures.

2. Information Disclosure

This information disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and resonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention and citations which contrast the subject invention or its merits against the backround of developments subsequent in time or priority.

Utility and advantages of honeycomb structures, panels and tables in various fields of technology are well known, as may, for instance, be seen from U.S. Pat. No. 3,627,246 by F. B. Widding et al, issued Dec. 14, 1971 for isolating leg structure for tables and the like, U.S. Pat. No. 3,784,146 by J. W. Matthews, issued Jan. 8, 1974 for a horizontal vibration isolation system, U.S. Pat. No. 4,360,184 by W. J. Reid, III, issued Nov. 23, 1982 for a pneumatic device for attenuation of vertical, horizontal and rotational dynamic forces, U.S. Pat. No. 3,606,460, by M. J. Shannon, issued Sep. 20, 1971 and disclosing furniture and table construction with honeycomb panels, U.S. Pat. No. 3,754,812, by H. Mohn, issued Aug. 28, 1973 and disclosing optical elements with honeycomb support plate, U.S. Pat. No. 3,765,993, by S. L. Raffensparger et al, issued Oct. 16, 1973 and disclosing a layup machine for assembling honeycomb core panels, U.S. Pat. Nos. 4,035,061, issued Jul. 12, 1977 and 4,182,553, issued Jan. 8, 1980, by N. K. Sheridon, disclosing honeycomb display devices, and U.S. Pat. No. 4,066,249, by J. G. Huber, issued Jan. 3, 1978 and disclosing a modular vacuum work area with honey-comb core; all being herewith incorporated by reference herein.

Reference may also be had to U.S. Pat. Nos. 3,070,480, by R. C. Breiner, issued Dec. 25, 1962, and 3,104,194, by A. T. Zahorski, issued Sep. 17, 1963, both of which show honeycomb panels having corrugated sheets interposed between the honeycomb cores and outer panel sheets, and U.S. Pat. Nos. 3,087,565 and 3,087,571, by E. M. Kerwin, Jr., issued Apr. 30, 1963 for apparatus for damping flexural movements.

Reference may also be had to brochures entitled *Mechanical Properties of Hexcel Honeycomb Materials,* TSB 120, and *The Basics on Bonded Sandwich Construction,* TSB 124, by Hexcel Corporation (1982 Revision).

For an extensive tutorial discussion on optical honeycomb tables, reference may be had to the 1977–78 Catalog, pp. 2 et seq., and the 1983–1984 Catalog, pp. 3 et seq., 2nd Edition, including discussion of the multilevel panel systems on pages 40 and 41 thereof, by the subject assignee Newport Corporation.

In this respect, by way of example and not by way of limitation, among the most sensitive applications to which optical tables are put are those involving interferometry, where tolerable relative displacements of reflective elements are measured in fractions of a micron and allowable table top bending or twisting is typically much less than a second of arc.

Even when requirements are less demanding, it is best to choose a table system that offers that kind of performance, thereby eliminating any likelihood of table related problems.

The rigidity of a panel or table used in optical research is one of the primary performance features and, for a given panel thickness and skin, depends largely on the shear modulus of the core.

For these and related reasons, honeycomb cores are greatly preferred for very stable panel and table systems.

In the past, granite plates and slabs were frequently used in laser holography and interferometry work. However, while granite offers great stability, the lack of a generally acceptable means of securing components to granite surfaces, as well as the great weight of granite slabs, is increasingly displacing them from laboratories and similar environments.

A major advantage of honeycomb panels or tables is that their top skin or table leaf can be provided with a large number of mounting holes which have a very minor effect on panel or table rigidity and strength. Typically, such mounting holes are present in great number and are tapped, thereby permitting the mounting of optical instruments and other components in a wide variety of desired locations.

In some applications, the drilling and tapping of holes in the panel or table top skin leaves residues in the cells of the honeycomb core. Where the honeycomb cores have to be very thick between top and bottom skins for high rigidity and stability, contaminants in the honeycomb cells are sometimes difficult to remove.

Reference may in this respect be had to U.S. Pat. No. 3,137,604, by L. R. Bosch, issued Jun. 16, 1964 for a honeycomb structure and process of manufacture, but failing to suggest any solution to the latter problem.

The same applies to the proposal according to U.S. Pat. No. 4,370,372, by W. E. Higgins et al, issued Jan. 25, 1983 for a method of joining honeycomb panels using a fastener element, and to the proposal according to U.S. Pat. No. 3,249,659, by W. D. Voelker, issued May 3, 1966 for a method of making laminated panel structures in which perforations are provided in reinforcing members between internal cells.

Efforts of providing honeycomb panels in non-analogous areas have worked against, rather than for, a solution, as may be seen from U.S. Pat. No. 2,870,857, by E. E. Goldstein, issued Jan. 27, 1959 for a translucent acoustical correction ceiling construction, U.S. Pat. No. 4,294,329, by P. M. Rose et al, issued Oct. 13, 1981 for a double layer attenuation panel, U.S. Pat. No. 4,300,978, by C. E. Whitemore et al, issued Nov. 17, 1981 for a bonding tool for venting honeycomb noise attenuation structures, and U.S. Pat. No. 4,465,725, by F. J. Riel, issued Aug. 14, 1984 for another noise suppression panel.

These proposals teach preservation of internal flow-through capability between internal honeycomb cells in addition to flow-through to the panel environment, which is just the opposite of what would be needed for clean-room compatibility after contamination of cells during manufacture of the panels.

This, then can cause problems in clean-room, vacuum and other environments where contaminants are able to leave honeycomb cells through apertures in the top skin to an extent producing a noticeable effect in the particular environment.

In this respect, it has been claimed that the use of threaded inserts in lieu of tapped top skin holes avoids the use of oil that could affect delicate optical opponents. Reference may in this respect be had to the brochure entitled *Optical Hardware*, by Melles Griot (1983), pp. 2 to 6. Among the problems of that approach is, of course, the fact that even a medium sized table of, say, four feet by six feet size, requires over three thousand threaded inserts which have to be individually positioned and attached to the top skin, if mounting holes one inch apart are to be provided in the table top.

Another approach would be to close each tapped mounting hole with a threaded stud, before the honeycomb panel or table is put into service. This, too, would require the use and insertion of thousands of studs in practical applications and, moreover, would, of course, only seal off, but not remove, oil and other drilling and tapping residues from honeycomb cells.

According to advertisements by Technical Manufacturing Corp., of Peabody, Mass. 01960, which have appeared in *Photonics*, October 1985 and January 1986, and in *Lasers and Applications*, September 1985, the tapped holes in the vibration isolation table leaf are individually equipped with metal cups projecting into the honeycomb table cells. In the words of the advertisers, every threaded hole in the top surface is enclosed from below with a welded and epoxy-sealed metal cup, and no inserts are used. Those cups do not appear to impart a beneficial structural or dynamic effect to the vibration isolation performance of the table.

This is confirmed in U.S. Pat. No. 4,645,171, by Ulf B. Heide, issued Feb. 24, 1987 to Technical Manufacturing Corporation, and being expressly limited to non load bearing enclosures. References cited in that patent include U.S. Pat. No. 3,176,662, by R. E. Williams, issued Apr. 6, 1965 for an illustrator's pen holder desk set and components therefor, U.S. Pat. No. 3,456,806, by S. M. Borston, issued Jul. 22, 1969, for a hair curler stand, U.S. Pat. No. 3,601,343, by A. H. Sivaslian, issued Aug. 24, 1971, for a strain-free mount having beamlike support elements, U.S. Pat. No. 3,836,416, by R. L. Ropiequet, issued Sep. 17, 1974, for non-woven thermoplastic fabrics including filaments extruded through orifices in the die of an extrusion chamber, U.S. Pat. No. 4,221,014, by S. L. Davidson, issued Sep. 9, 1980, for a post storage rack having openings in a support plate for drainage and for accommodation of projecting post ends, U.S. Pat. No. 4,241,892, by I. B. Morris, issued Dec. 30, 1980, for an appliance skidboard having top and bottom perforations, and Federal Republic of Germany Patent 836 401, by Wilhelm Dichmann II, issued Apr. 10, 1952, for method and table for retaining papers, cardboard, plywood, metal foil, and the like, having an apertured table top on a vacuum chamber. Another U.S. Pat. No. 4,666,748, by Isaac Rinkewich, issued May 19, 1987, discloses an article of furniture composed of a plurality of curved sections, while U.S. Pat. No. 4,913,953, by K. M. Prewo et al, issued Apr. 3, 1990, discloses integral chopped fiber reinforced glass or glass-ceramic structures, having a grid array of chambers.

None of these references suggest a solution for the problem at hand.

On the other hand, the common assignee hereof, as shown in the above mentioned parent U.S. Pat. No. 4,621,006, has provided clean-room compatible table systems which are relatively easy to manufacture, but are very effective in practice.

Reference may in this respect be had to the above mentioned Second Edition of the Newport Corporation 1983–1984 Catalog, including p.32, second paragraph, and generally to The Newport Catalog No. 100, published 1987, and particularly to section A thereof, on Vibration-Isolated Table Systems.

A recent species of the original invention disclosed herein and in my parent applications since Oct. 22, 1984, is apparent from U.S. Pat. No. 5,061,541, by M. Gertel, issued Oct. 29, 1991 to Kinetic Systems, Inc., for honeycomb tables having supporting structures of corrugated material between a honeycomb core and the table leaf for clean-room compatibility, with or without cups registering with threaded mounting holes in the table leaf.

SUMMARY OF THE INVENTION

It is a general object of this invention to overcome disadvantages or meet needs expressed or implicit in the Information Disclosure Statement or in other parts hereof.

It is a related object of this invention to provide improved apparatus upon which components may be mounted, including honeycomb panels and tables, hereinafter simply referred to as "honeycomb tables."

It is also an object of this invention to provide improved clean-room compatible tables suitable for use in sensitive applications involving precision components.

It is a germane object of this invention to provide improved methods of manufacturing structures suitable for mounting components, such as honeycomb table structures.

It is also an object of this invention to render such structures and honeycomb tables clean-room compatible.

Other objects of this invention will become apparent in the further course of this disclosure.

The subject invention resides in a method of manufacturing a structure suitable for mounting components, which comprises providing an apertured table leaf, providing a facing sheet, spacing that table leaf from that facing sheet at a first distance, placing a section of honeycomb core between that table leaf and the facing sheet, sealing off apertures in that table leaf from that section of honeycomb core by placing a sealing sheet at a level spaced from that table leaf by a second distance which is small as compared with the aforesaid first distance to prevent contaminants from migrating between the apertures and the honeycomb core, placing load bearing support structure between the table leaf and the sealing sheet, and connecting the table leaf, the sealing sheet, the facing sheet, the load bearing support structure and the honeycomb core together within the aforesaid structure.

The invention resides also in a method of manufacturing a honeycomb table having a table leaf with apertures suitable for mounting components in sensitive applications, and, more specifically, resides in the improvement which comprises, attaching a supporting section to that table leaf, attaching a sealing sheet to that supporting section, attaching a section of honeycomb core to that sealing sheet, and attaching a facing sheet at a position on said table such that said section of honeycomb core is positioned between the table leaf and such facing sheet; such method including drilling and tapping apertures in the table leaf.

From another aspect thereof, the invention resides in a honeycomb table having at least a width dimension, comprising a top facing sheet perforated with openings having a top surface for supporting components and a bottom surface, a bottom facing sheet parallel to the top facing sheet, a section of corrugated sheet material extending beneath the top facing sheet, a honeycomb core having cells of equal length extending between the section of corrugated sheet material and the bottom facing sheet; the section of corrugated sheet material being secured between the top facing sheet and the honeycomb core.

According to this aspect of the invention, the honeycomb table further comprises a sealing sheet at the interface between the honeycomb core and the section of corrugated sheet material; that sheet and section of corrugated sheet material being secured together.

Also according to an embodiment of this aspect of the invention, the honeycomb table is comprised of, in the following order:

(a) the top facing sheet;

(b) the section of corrugated sheet material;

(c) the sheet at the interface between the honeycomb core and the section of corrugated sheet material;

(d) the honeycomb core; and (e) the bottom facing sheet.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts and in which:

FIG. 5 is a side view of a table top skin or leaf and equipment for executing a phase of manufacture of a honeycomb table according to a further embodiment of the subject invention;

FIG. 6 is a longitudinal section through the table top leaf according to FIG. 5, with partially attached means for rendering the table clean-room compatible according to the further embodiment of the subject invention; and FIG. 7 is an elevation of part of a honeycomb table employing the table leaf shown in FIGS. 5 and 6, and illustrates a phase of manufacture of that honeycomb table part.

DESCRIPTION OF PREFERRED EMBODIMENTS

Figure 1:
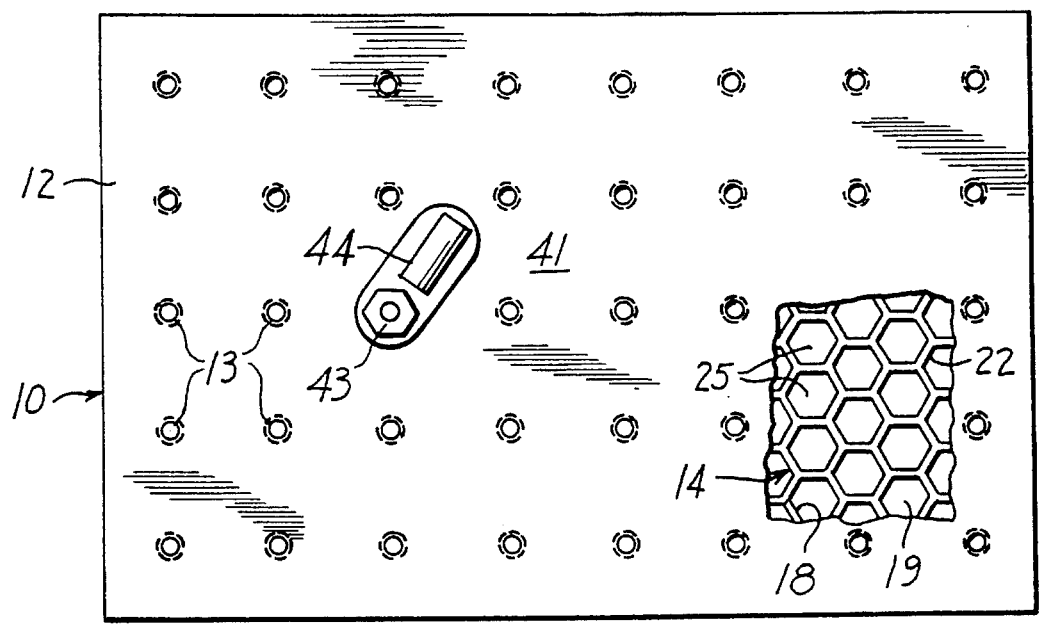
FIG. 1 is a top view of a honeycomb table, having a part broken away to disclose internal structure embodying the subject invention.

The honeycomb table 10 whose top view is shown in FIG. 1 has a top skin or leaf 12, herein for brevity referred to as "table leaf." The subject invention has utility in the manufacture of various honeycomb breadboards, panels, tables and similar structures, herein for brevity referred to as "honeycomb tables."

In practice, honeycomb tables of the type herein disclosed are frequently used with other components and structures, such as in or with vibration isolation systems, as may be seen from the above mentioned Newport Corporation 1983–84 Catalog and from U.S. Pat. No. 3,784,146, by John W. Matthews, Ph.D., issued Jan. 8, 1974 and herewith incorporated by reference herein.

The table leaf 12 is apertured, having a multitude of threaded or tapped mounting holes 13 therethrough, for an attachment of various optical and other components used on the honeycomb table for experimentation, research and development, or for industrial analysis, design and testing or a great variety of other purposes. While only a limited number of apertures 13 are shown in FIG. 1, an actual honeycomb table for optical purposes typically has thousands of tapped mounting holes arranged in a regular grid pattern in parallel to the length and the width of the table.

The honeycomb table 10 has a honeycomb core 14 extending between and supporting the apertured table leaf 12 and a bottom or facing sheet 16 spaced from the table leaf 12 by a first distance 17. The honeycomb core 14 has internal cells 18 extending between the table leaf 12 and the facing sheet 16 and communicating with apertures 13 in the table leaf. Of course, this does not necessarily mean that the honeycomb cells 18 extend uninterruptedly from the table leaf 12 to the facing sheet 16. Rather, the honeycomb cells may be interrupted, sealed off or sectioned, as will become more fully apparent in the further course of this disclosure.

In the manufacturing method and construction shown in FIGS. 1 to 4, the preferred embodiment of the subject invention illustrated therein renders the honeycomb table 10 clean-room compatible by sealing the cells 18 at a level 19 thereof spaced from the table leaf 12 by a second distance 20 several times smaller than the first distance 17.

Figure 2:
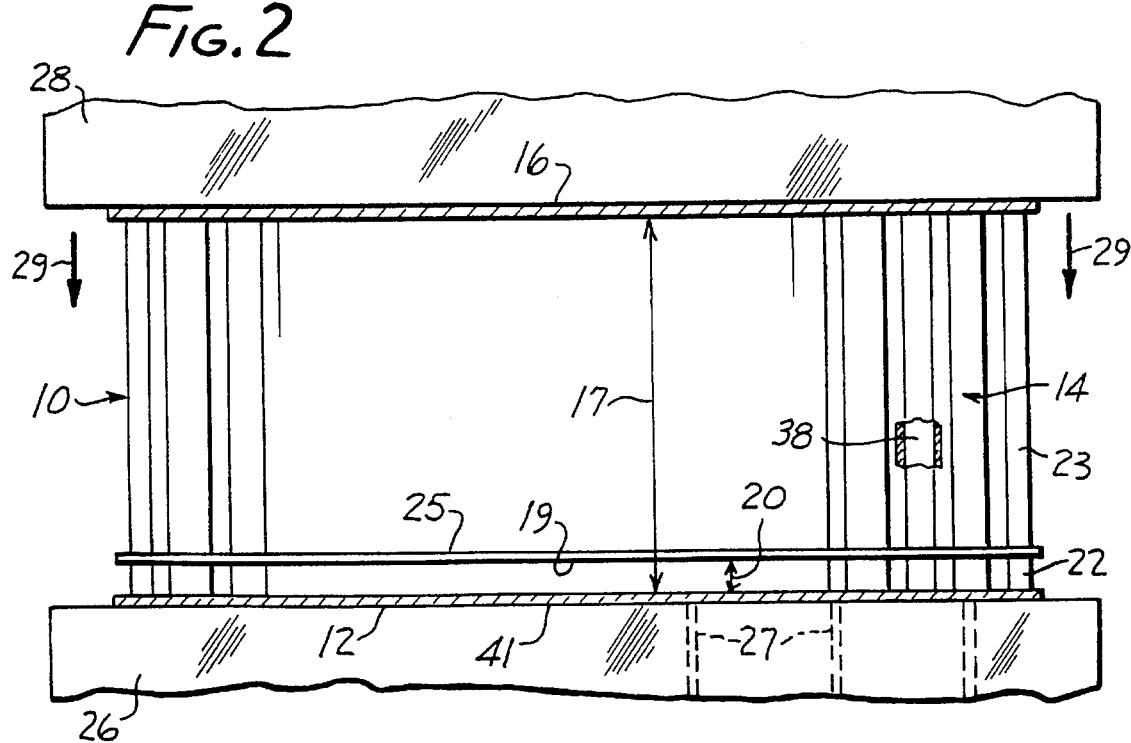
FIG. 2 is an elevation of part of a honeycomb table during a phase of its manufacture according to an embodiment of the subject invention.
Figure 3:
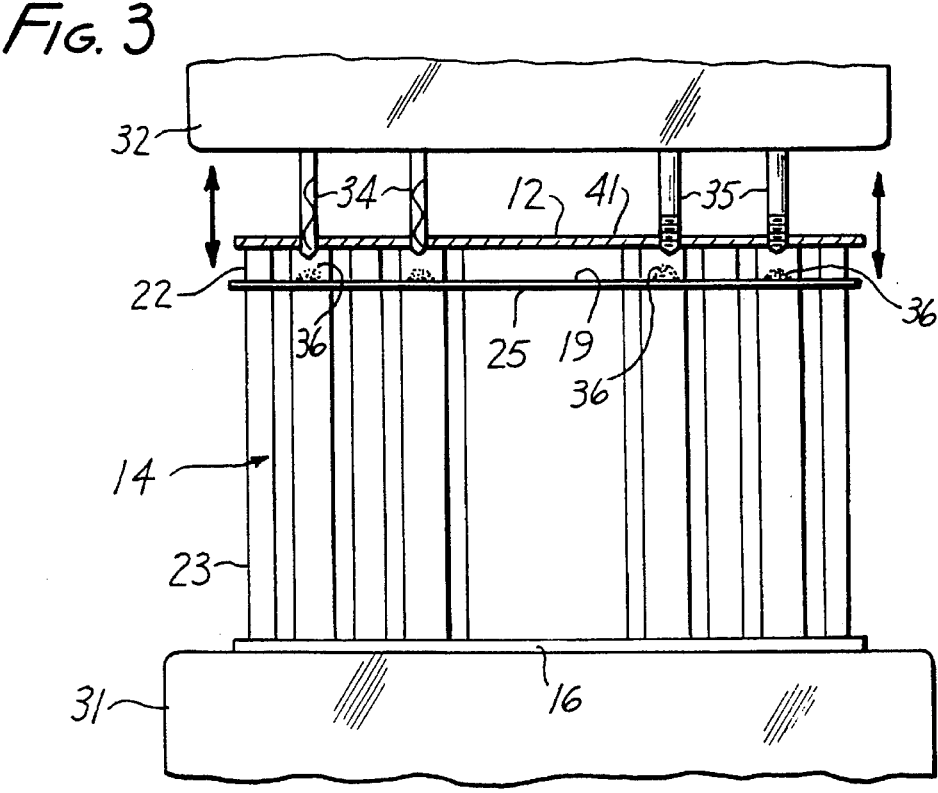
FIG. 3 is a side view of the honeycomb table part of FIG. 2 and illustrates a further phase of the manufacture of the honeycomb table according to an embodiment of the subject invention.
Figure 4:
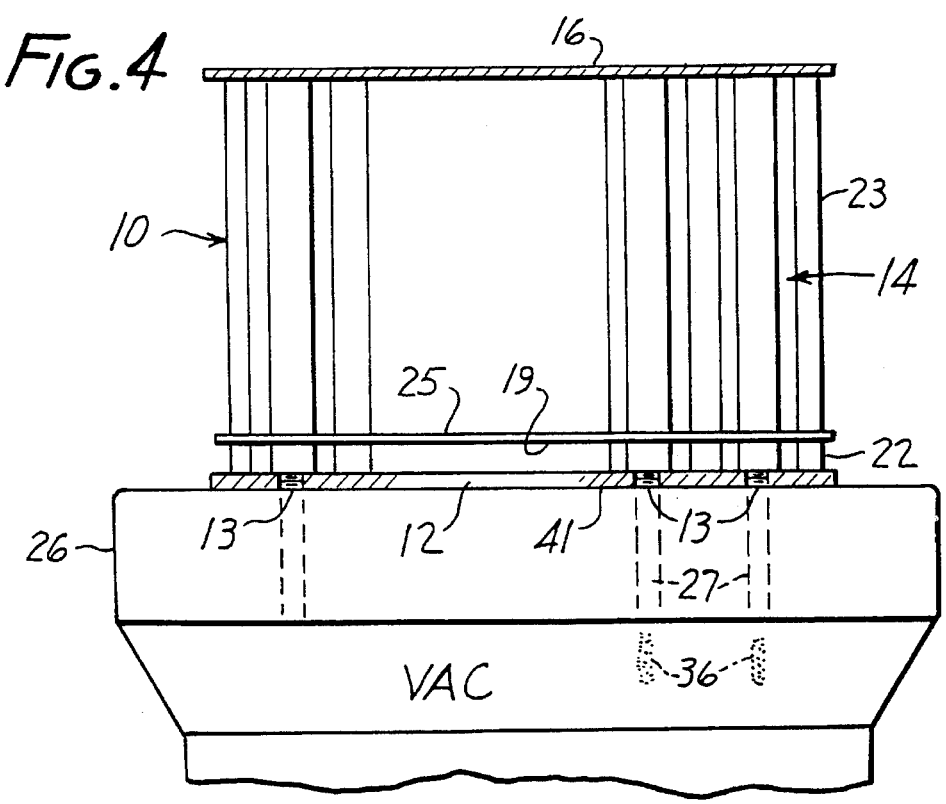
FIG. 4 is a view similar to FIG. 3, illustrating yet another phase in the manufacture of the honeycomb table according to the latter embodiment of the subject invention.

As illustrated in FIGS. 2 to 4, the honeycomb core 14 may be composed of celled first and second honeycomb sections 22 and 23, with the first section being made several times smaller in thickness or depth than the second section, and such first section 22 being located adjacent to, or being made to support, the table leaf 12, while the second section 23 extends to or is made to support the facing sheet 16.

The honeycomb sections 22 and 23 may each be manufactured in a conventional manner. By way of example, the above mentioned brochure TSB 120 describes and illustrates on page 2 thereof the well-known expansion process of honeycomb manufacture, as well as the equally well-known corrugation process. In this respect, the expression "honeycomb" as herein employed and as generally used in industry is not restricted to exact hexagonal configurations. Rather, that expression is generally also applied to core configuration composed of corrugated sheets that form cells of other than hexagonal cross-section. Of course, those skilled in the art will select the best cell or core configuration for a given application. For instance, if highest precision is essential, cheap substitutes are to be avoided, as the above mentioned Newport Corporation 1983–84 Catalog points out on page 4 thereof under the subtitle "Pseudo Honeycomb Panels." Nevertheless, corrugated sheets glued together at their crests may be suitable in high-performance honeycomb cores.

Various materials used in the manufacture of honeycomb structures may also be employed in the practice of the subject invention. For instance, the honeycomb core 14 or sections 22 and 23 may be made from an aluminum alloy, from steel or of plastic material, to name a few examples.

The smaller honeycomb core section 22 may be first attached to the table leaf 12, while the thicker honeycomb core section 23 is separately attached to the facing sheet 16. Conventional adhesives may be employed for this purpose.

The above mentioned brochures TSB 120 and 124 contain tutorial comments on the use of preferred adhesives and adhesive mats for special purposes.

A sealant or barrier layer 25 is interposed between the core-sections 22 and 23 at the level 19. To this end, the table leaf 12 with attached smaller core sections 22 may be placed on a table 26 while a vacuum is drawn, such as through channels 27 in the support table 26, until the table leaf 12 is extremely flat.

The cells 18 of the smaller first honeycomb section 22 may be sealed off by bonding a sealing sheet 25 to such first section over a side thereof at the level 19 opposite the table leaf 12. The sealing sheet 25 may be made of include the same material or materials as the honeycomb structure itself. By way of further example, glass or aramidfiber reinforced plastic or adhesive materials may be employed as the sealing sheet 25.

The table leaf 12 is preferably pulled flat on the vacuum table 26 after the smaller first honeycomb section 22 has been attached to that table leaf 12 and the cells 18 of such first section have been sealed, such as by bonding the sealing sheet 25 to the smaller first honeycomb section. This is preferably done before the larger second section is combined with such first section 22.

The larger second honeycomb section 23 may then be bonded to the sealing sheet 25. As shown in FIG. 2, a flat plate 28 resting on the facing sheet 16 and applying a bonding force in the direction of arrows 29, may be employed in conjunction with the table 26 in bonding the larger second honeycomb section 23 with attached facing sheet 16 to the sealing sheet 25.

That sealing sheet 25 may thus be employed as a means for bonding the unequal honeycomb sections 22 and 23 to each other.

According to the embodiment shown in FIG. 2, the sections 22 and 23 are bonded to form together the honeycomb structure 14 before the apertures 13 are drilled into the table 12.

Once the cells 18 of the smaller honeycomb section 22 have been sealed off, such as by the sealing sheet 25, the apertures 13 may be provided in the embodiment of FIGS. 2 and 3. As shown in FIG. 3, the honeycomb structure 14 with attached table leaf 12 and facing sheet 16 may be inverted relative to its position shown in FIG. 2 and may be placed on a worktable 31. A machine tool 32 may then be employed to first drill and then tap the apertures 13, row by row across and along the table leaf 12.

In practice, a series of drills, followed by a series of tapping bits is employed to this end. For the purpose of illustration, FIG. 3 shows drills 34 on the left-hand side and tapping bits 35 on the right-hand side thereof.

As indicated at 36 in FIG. 3, drilling and tapping of the apertures 13 leaves a certain residue in the honeycomb cells. By way of example, that residue may be composed of a cutting oil or other medium used in the making of the tapped apertures, as well as particles of the metal or other material from which the table leaf 12 is made.

Within the scope of the subject invention, the drilling, tapping and cleaning steps shown in FIGS. 3 and 4 may be carried out before the sealed-off smaller section 22 is bonded to the larger table section 23.

The honeycomb table 10 is rendered clean-room proof by cleaning the sealed cells 18 through apertures 13 in the apertured table leaf prior to use of the table in a clean room or even prior to bonding of the honeycomb core section 22 to the core section 23.

If the honeycomb structure 14 had cells extending all the way from the top sheet 12 to the bottom sheet 16, then it would be practically impossible with thick table structure to remove all possible contaminants from such elongated cells. However, the sealed-off shallow cells 18 in the small honeycomb section 22 are readily cleaned without great problems.

By way of example and as shown in FIG. 4, table structure 10 or section 22 is inverted and placed on the vacuum table, and the residues or contaminants 36 are readily removed from the shallow cells through the tapped apertures 13. For instance, the residues 36 may be pulled with the aid of a vacuum through channels 27 of the vacuum table 26.

The table structure may be finished in a conventional manner by encasing it in an appropriate frame. Damping media may be added as desired. The finished table structure may once more be subjected to the cell cleaning process shown in FIG. 4, before it leaves the plant. If desired, the entire cell cleaning operation could be performed only after the table 10 has otherwise been completely finished.

According to FIGS. 2 to 4, the second honeycomb section 23 is combined with the first section 22 so that cells of the second honeycomb section extend between the sealed cells 18 of the first honeycomb section and the facing sheet 16 spaced from the table leaf 12. As mentioned above, the second section 23 may be bonded to the section 22 after the sealed first section 22 has been drilled, tapped and cleaned in the manner illustrated in FIGS. 3 and 4.

The larger cells of the second honeycomb section 23 are completely sealed off by the facing sheet 16 on the one hand and the sealing sheet 25 on the other hand, so that only the shallow cells 18 of the smaller honeycomb section 22 need be cleaned.

The completely sealed-off longer honeycomb cells of the larger section 23 are shown in FIG. 2 at 38 and extend from the sealing sheet 25 to the bottom facing sheet 16.

The method according to the subject invention for manufacturing a structure suitable for mounting components, such as a honeycomb table 10 comprises providing an apertured table leaf 12, providing a facing sheet 16, spacing the table leaf from the facing sheet at or by a first distance 17, and placing a section of honeycomb core 14 between the apertured table leaf 12 and the facing sheet 16. In the illustrated embodiments, the honeycomb core has internal cells 38 extending between the table leaf and the facing sheet. According to the subject invention, that honeycomb table is rendered clean-room compatible. Apertures 13 in the table leaf 12 are sealed off from the section of honeycomb core 14 by placing a sealing sheet 25 at a level 19 spaced from the table leaf 12 by a second distance 20 which is small compared to or with the first distance 17 to prevent contaminants from migrating between the apertures 13 and the honeycomb core 14. A load bearing support structure 22 is placed between the table leaf 12 and the sealing sheet 25, as shown, for instance, in FIGS. 2 to 4, but no limitation to any sequence of steps is intended by this disclosure or by any recitation of steps in any claim. The table leaf 12, the sealing sheet 25, the facing sheet 16, the load bearing support structure 22 and the honeycomb core 14 are connected together within the structure 10 in any sequence.

From a related aspect thereof, the subject invention resides in a method of manufacturing a honeycomb table including a table leaf 12 having an outside surface 41, and having a honeycomb core 14 supporting the table leaf and extending inside such table leaf 12 between that table leaf and a facing sheet 16 spaced from that table leaf.

According to this aspect of the invention, apertures 13 are provided in the table leaf, such as in the manner shown in FIG. 3 or FIG. 5, for receiving fasteners, including for instance a bolt 43 therein for attaching objects, including for instance an optical component schematically illustrated at 44, at the outside surface 41 of the optical table. Again, the honeycomb table is rendered clean-room compatible by sealing the honeycomb core 14 against the apertures 13 inside the table leaf 12.

Within the scope of the subject invention, FIGS. 5 to 7 show a further embodiment, according to which the attachment apertures 13 are first provided in the table leaf 12, to which the sealant and the honeycomb core are thereafter applied.

In particular, as shown in FIG. 5, the bare table leaf 12 is first placed on a worktable 47 where it is held by supports 48 in spaced relationship thereto, permitting execution of the drilling and tapping operation by the machine tool 32 described above.

The embodiment of the invention illustrated in FIG. 6 then executes the step of applying to an inside surface 51 of the table leaf, opposite the above mentioned outside surface 41, a sealant releasably covering the apertures 13. As indicated in FIG. 6, that sealant may in fact be the same as the above mentioned sealing sheet 25 shown in FIGS. 2 to 4 and, therefore, bears the same reference numeral. As illustrated in FIG. 6 at 53 in a partially removed portion of the sealing sheet 25, that sheet may include reinforcing fibers or a reinforcement fabric.

As seen in FIGS. 2 to 4 and 7, the sealing sheet 25 is interposed between the table leaf 12 and the honeycomb core 14 or 23 for sealing off the internal cells 38 or 56 against the mounting holes 13 in the table leaf. As seen in FIG. 7 by reference to FIG. 6, the sealing sheet 25 releasably covers the mounting holes 13 and extends between the honeycomb core 14 and the table leaf along an inside surface 51 of that table leaf 12.

For instance, a fiberglass fabric reinforced adhesive or plastic material 54 may be used as the sealing sheet 25. An aramid-fiber reinforced adhesive or plastic material may also be used at 25.

The adhesive or sealant 54 in the sheet 25 may comprise an epoxy, silicone rubber, or urethane sealing or adhesive compound.

The honeycomb core 14 is attached to the inside surface 51 of the table leaf 12. If the sealant is also an adhesive, then the honeycomb core 14 may be attached to the table leaf with that sealant or adhesive coating.

As seen in FIG. 7, the honeycomb structure 14 with attached facing sheet 16 is applied to the adhesive sealing sheet 25 for attachment of the honeycomb structure 14 to the table leaf 12. The vacuum table 26 and top plate 28 may be employed for this purpose. The adhesive in the sealing sheet 25 may then be cured, such as with the aid of a conventional hardener and by heat or passage of time, depending on the nature of the adhesive. Epoxy and similar adhesives that do not require elevated external curing temperatures are generally preferred for present purposes.

The completed honeycomb tables described so far with the aid of FIGS. 2 and 7 comprise an apertured table leaf 12 having an outside surface 41, a facing sheet 16 spaced from such table leaf, and a honeycomb core 14 supporting the table leaf and extending inside such table leaf between that apertured table leaf 12 and the facing sheet 16 and having internal cells 18, 38 or 56 between the table leaf and facing sheet.

According to the subject invention, means for rendering the honeycomb clean-room compatible include the sealing sheet 25 or other means for sealing the internal cells against the apertures 13 inside the table leaf 12.

As disclosed in or in connection with FIGS. 6 and 7, the means for sealing the internal cells 56 include a sealant 25 covering inside surface areas of the table leaf 12 at the honeycomb core 14 opposite the table leaf outside surface 41, and covering also the apertures 13 at the inside of the table leaf.

Such sealant or sealing sheet 25 does not interfere with the normal operation of the honeycomb table. For instance, if fastening bolts 43 are threaded into the apertures 13, then the sealing sheet 25 is only touched when the length of the bolt below its head exceeds the thickness of the table leaf 12. However, even if the bolt exceeds such thickness, the optical or other component 44 still can readily be attached to the table leaf 12, since the bolt will then push into or through the sealing sheet 25. This will not have an adverse effect at that point, since no contaminant is introduced into the honeycomb cells thereby.

FIG. 7 also illustrates a further embodiment, according to which a clean-room compatible sealing compound is provided. Such compound may, for instance, be a silicone rubber, polyurethane foam or other stable compound that is easily removed mechanically but does not exude objectionable contaminants.

As shown in FIG. 7, honeycomb cells 56 are filled from the apertured table leaf 12 to the above mentioned level 19 with such sealing compound 58. In practice, such partial filling of honeycomb cells with sealing compound 58 may proceed through apertures 13. In fact, such apertures may at the same time be filled with the sealing compound as well. In that case, the sealing compound 58 may be removed from apertures 13 in the table leaf as needed for an attachment of components 44 to such table via the latter apertures. In practice, such partial removal of the sealing compound 58 may be effected with the aid of a tool similar to the tapping bits 35. However, since no cutting oil or other potential contaminant is used in partially removing the sealing compound 58, there is no danger of contaminating the environment of the honeycomb table.

As seen in FIGS. 1 to 4, a honeycomb table within the scope of the invention having at least a width dimension comprises a top facing sheet 12 perforated with openings 13 having a top surface 41 for supporting components 44 and a bottom surface (e.g. 51), a bottom facing sheet 16 parallel to the top facing sheet 12, a section of corrugated sheet material 22 extending for at least a distance corresponding substantially to the width of the table 10 beneath the top facing sheet 12, a honeycomb core 14 having cells 38 of equal length extending between continuous flat top and bottom surfaces of that honeycomb core 14 and between the section of corrugated sheet material 22 and the bottom facing sheet 16. That section of corrugated sheet material 22 is secured to the above mentioned bottom surface of the top facing sheet 12 and between that top facing sheet and the honeycomb core 14. The drawings show the section 22 as a honeycomb, but it is understood in the honeycomb table making art that a honeycomb core or section may be made from corrugated sheets, as mentioned above after "Pseudo Honeycomb Panels." Accordingly, what FIGS. 1 to 4 show at 22 may be corrugated sheets glued together at their crests to form the honeycomb structure seen in FIG. 1, for instance or otherwise to form a table leaf or top facing sheet support section within the scope of the invention.

The honeycomb table may include a sheet 25 at the interface between the honeycomb core 14 and the section of corrugated sheet material 22; such sheet 25 and section of corrugated sheet material 22 being secured together.

As seen in FIGS. 1 to 4, when FIGS. 2 and 4 are turned downside up to the table's working position, the honeycomb table 10 is comprised of, in the following order:

(a) the top facing sheet 12;

(b) the section of corrugated sheet material 22;

(c) the sheet 25 at the interface between the honeycomb core 14 and the section of corrugated sheet material 22;

(d) the honeycomb core 14; and (e) the bottom facing sheet 16.

Considering this disclosure including the drawings, it is clear that the invention resides in apparatus 10 upon which components 44 may be mounted, comprising a table leaf 12 having an outside surface 41, a pattern of mounting holes 13 in that table leaf, a facing sheet 16 spaced from the table leaf at a first distance 17, a section 23 of honeycomb core 14 situated between the apertured table leaf and the facing sheet, which is less than the first distance 17 but at least one-half the first distance 17 in depth, a sealing sheet 25 situated between the table leaf and the section 22 of honeycomb core at a second distance 20 from the table leaf 12 which is several times smaller than first distance 17 and a load-bearing support section 22 between the sealing sheet 25 and the table leaf 12.

According to a preferred embodiment of the invention, the load-bearing structure support section 22 further comprises means for substantially confining materials 36 introduced into that support section through any of the apertures 13 within a region which is small in relation to the entire area between the table leaf 12 and the sealing sheet 25, as explained above with respect to the accompanying drawings.

The load-bearing support section 22 may comprise a second section of honeycomb core, as shown in FIGS. 1 to 4 or as broadly defined above, referring, for instance to corrugated sheets. The section 23 of honeycomb core 14 may be attached to the sealing sheet 25, as shown, for instance, in FIGS. 2 to 4, and may also be attached to the facing sheet 16.

According to the embodiment shown in FIG. 1, the mounting holes 13 are arranged in a regular grid of rows parallel to the length and width of the table leaf 12. As mentioned above there are at least one thousand mounting holes 13 in the table leaf 12, even though only a limited number could be shown in the drawing.

From a related aspect thereof, the invention resides in a clean-room compatible honeycomb table suitable for use in sensitive applications involving precision components. In addition to the mounting holes 13 suitable for holding such components 44, the table leaf 12 having an outside surface 44, the pattern of mounting holes in the table leaf, comprised of tapped apertures at 13 which extend through the thickness of the table leaf, and the facing sheet 16 spaced from that table leaf 12 at a first distance 17, as already described above, this aspect of the invention situates a sealing sheet 25 between the leaf and the facing sheet at a second distance 20 from that table leaf 12 which is several times smaller than the first distance 17, and situates a section 23 of honeycomb core 14 between that sealing sheet 25 and the facing sheet 16. As seen, for instance, in the drawings, that core section 23 extends for a distance of less than the first distance 17 but more than half of the first distance 17 sufficiently to provide stability to the table 10. That aspect of the invention also provides a load-bearing support section between the sealing sheet 25 and the table leaf 12, such as shown at 22 in FIGS. 2 to 4 or as otherwise described above.

The invention also resides in a method of manufacturing a structure suitable for mounting components comprising the steps of forming an apertured table leaf 12, forming a facing sheet 16, spacing that table leaf from that facing sheet, placing a section 23 of honeycomb core 14 between that table leaf and that facing sheet, sealing off the apertures 13 in the table leaf from that section of honeycomb core with a sealing sheet 25 which prevents contaminants from migrating between such apertures and the honeycomb core, and connecting the table leaf 12, sealing sheet 25, facing sheet 16, and honeycomb core together within the structure 10.

As shown by way of example in FIGS. 2 to 4, the sealing sheet 25 is placed at a level 19 spaced from the table leaf 17 by a distance 20 which is small as compared with that distance (17 minus 20) at which the sealing sheet is spaced from the facing sheet 16.

The disclosed embodiments of the invention place load-bearing support structure between the table leaf and the sealing sheet, such as the illustrated structure 22 or its corrugated above mentioned version. The section of honeycomb core 23 is cleaned prior to sealing the same off from the apertures 13, and the area between the table leaf and the sealing sheet is cleaned as shown, for instance, in FIG. 4 or as otherwise mentioned above.

A method of manufacturing a honeycomb table suitable for mounting components in sensitive applications according to the invention may be described as comprising the steps of drilling and tapping apertures in a table leaf 12, such as shown in FIG. 3 or 5, attaching a supporting section 22 to that table leaf, attaching a sealing sheet 25 to that supporting section, attaching a section 23 of honeycomb core 14 to that sealing sheet, and attaching a facing sheet 16 at a position on the table such that the section 23 of honeycomb core 14 is positioned between the table leaf and the facing sheet. The honeycomb core 23 may be attached directly to facing sheet 16. As disclosed above and in the drawings, the apertures 13 may be drilled in the table leaf 12 prior to attaching the supporting section 22 to the table leaf. Alternatively, the apertures 13 may be drilled and tapped in the table leaf 12 after attachment of the supporting section 22 to the table leaf and of the sealing sheet 25 to that supporting section 22, such as shown in FIG. 3 or otherwise within the scope of the invention.

Various modifications and variations within the spirit and scope of the subject invention are apparent to those skilled in the art from the subject extensive disclosure.

I claim:

1. A honeycomb table having at least a width dimension comprising:

a top facing sheet perforated with openings having a top surface for supporting components and a bottom surface;

a bottom facing sheet parallel to said top facing sheet;

a section of corrugated sheet material extending beneath said top facing sheet;

a honeycomb core having cells of equal length extending between said section of corrugated sheet material and said bottom facing sheet;

said section of corrugated sheet material being secured between said top facing sheet and said honeycomb core; and a sealing sheet at the interface between said honeycomb core and said section of corrugated sheet material; said sealing sheet and section of corrugated sheet material being secured together.

2. The honeycomb table of claim 1 wherein said section of corrugated sheet material is a load bearing support structure.

3. The honeycomb table of claim 2 wherein said top facing sheet is metallic.

4. The honeycomb table of claim 2 wherein said honeycomb core is of aluminum alloy.

5. The honeycomb table of claim 2 wherein said honeycomb core is of steel.

6. The honeycomb table of claim 2 wherein said honeycomb core is of plastic material.

7. The honeycomb table of claim 1 wherein said top facing sheet is metallic.

8. The honeycomb table of claim 1 wherein said honeycomb core is of aluminum alloy.

9. The honeycomb table of claim 1 wherein said honeycomb core is of steel.

10. The honeycomb table of claim 1 wherein said honeycomb core is of plastic material.

\* \* \* \* \*